United States Patent

Shibata et al.

[11] Patent Number: 5,939,925
[45] Date of Patent: Aug. 17, 1999

[54] SEMICONDUCTOR CIRCUITRY TO PROCESS ANALOG SIGNALS USING WEIGHTED- SUM OPERATIONS

[75] Inventors: Tadashi Shibata; Tadahiro Ohmi; Ning Mei Yu; Tsutomu Nakai, all of Miyagi-ken, Japan

[73] Assignee: Tadashi Shibata and Tadahiro OHMI, Miyagi-ken, Japan

[21] Appl. No.: 08/930,508

[22] PCT Filed: Apr. 1, 1996

[86] PCT No.: PCT/JP96/00883

§ 371 Date: Nov. 7, 1997

§ 102(e) Date: Nov. 7, 1997

[87] PCT Pub. No.: WO96/30827

PCT Pub. Date: Oct. 3, 1996

[30] Foreign Application Priority Data

Mar. 31, 1995 [JP] Japan ........................................ 7-76931

[51] Int. Cl.⁶ ........................................ G06G 7/12
[52] U.S. Cl. ........................ 327/355; 327/356; 327/361; 327/120
[58] Field of Search ........................ 327/355, 356, 327/361, 350, 352, 116, 119, 120, 121, 122; 364/750.5

[56] References Cited

U.S. PATENT DOCUMENTS

| | | | |
|---|---|---|---|
| 5,444,411 | 8/1995 | Yang et al. | 327/361 |
| 5,600,270 | 2/1997 | Shou et al. | 327/75 |
| 5,789,961 | 8/1998 | Bulsara et al. | 327/355 |

FOREIGN PATENT DOCUMENTS

| | | | |
|---|---|---|---|
| 0 685 808A1 | 2/1994 | European Pat. Off. | G06G 7/60 |
| 5-135191 | 6/1993 | Japan | G06G 7/12 |

*Primary Examiner*—Toan Tran
*Assistant Examiner*—An T. Luu
*Attorney, Agent, or Firm*—Randall J. Knuth

[57] ABSTRACT

A semiconductor operational circuit conducts real-time analog vector operations to permit the determination of the center of gravity of an image of a moving object. The circuit employs a first processing stage utilizing CMOS source follower circuits to perform weighted linear sum operations on the analog signals. A second processing stage utilizes comparator circuitry to perform comparison operations involving data from the weighted-sum and non-weighted-sum operations. A third processing stage utilizes exclusive OR gates to provide digital data outputs based on the comparison operation results.

2 Claims, 12 Drawing Sheets

SEMICONDUCTOR CIRCUITRY TO PROCESS ANALOG SIGNALS USING WEIGHTED- SUM OPERATIONS

BACKGROUND OF THE INVENTION

1. Field of the Invention

The present invention relates to a semiconductor operational circuit, and in particular, relates to an operational circuit which is capable of conducting operations with respect to analog and many valued data at high speed and with a high degree of accuracy.

2. Description of the Related Art

In recent years, in concert with the development in computer technology, the progress in the field of data processing technology has been truly remarkable. However, when attempts were made to realize the flexible type of data processing conducted by human beings, it was almost impossible to obtain the results of such calculations in real time using present computers. The reasons advanced for this are that the data which human beings process in the course of their daily lives are analog data, so that there is firstly an enormous amount of such data, and moreover, these data are inexact and vague. It is thus a problem in present data processing systems that the extremely redundant analog data are all converted into digital values, and rigorous digital operations are conducted one by one. An example of this is image processing. For example, if one screen is incorporated into a 500×500 two dimensional array, then the total number of pixels is Two Hundred Fifty Thousand (250,000), and when the strength of the three colors red, green, and blue for each pixel is expressed in terms of eight bits, then the amount of data in one stationary image reaches Seven Hundred Fifty Thousand (750,000) bits. In moving images, the amount of image data increases with time. Given these conditions, let us consider data processing in which the center of gravity of an image in a screen is determined. Even in this processing, which might at first seem to be simple, the analog vectors which comprise the screen information are used, and it is necessary to conduct, one by one, sum operations and subtractions with respect to a large amount of analog data. If an attempt is made to realize such processing by means of a computer, it is first necessary to convert all the analog vectors into digital vectors, and after this, to conduct 4-rules operations in sequence, and even if a present day supercomputer is used, it is impossible to manipulate the large amount of (1) and (0) data and conduct picture recognition and understanding in real time.

On the other hand, attempts have been made to realize data processing approximating that of human beings by accepting real world data, which are analog values, in an unchanged form and conducting calculations and processing on these analog values, in order to overcome the problems described above. This approach represents the method best suited to real time processing; however, it has not yet been realized, and there exists presently no semiconductor operational circuit capable of conducting such operations in real time and with high accuracy.

The present invention was created in light of the above circumstances; it has as an object thereof to provide a semiconductor operational circuit which is capable of conducting calculations with respect to analog vectors at high speed and with high accuracy.

SUMMARY OF THE INVENTION

The present invention, in one form thereof, relates to semiconductor operational circuit which executes a predetermined operation with the respect to a signal train of N signals ($A_i, \ldots, A_{i=N}$) numbered using a first integer "i" which changes from 1 to N. The circuit comprises a first means for generating an output signal "M" proportional to the sum of the signal train $$\left(\sum_{i=1}^{N} A_i\right)$$

The circuit further comprises a second means for generating an output "S" proportional to the sum of the product of each one of the N signal train signals and a respective predetermined weighing constant $x_i$ defined with respect to the first integer "i"

$$\left(\sum_{i=1}^{N} x_i A_i\right)$$

There is provided a circuit for calculating the difference between $f_j M$ and $g_j S$ using L sets of constants ($f_j, g_j$) defined with respect to a second integer "j" which changes from 1 to L, and for generating an output signal having a logic "1" or "0" in accordance with the results thereof.

In the present invention, it is possible to conduct analog vector operations at extremely high speed and with a high degree of accuracy without requiring complicated control circuitry.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

The following is a list of reference numbers utilized throughout the application:

| | |
|---|---|
| 101, 102 | NMOS transistors, |
| 103, 104 | PMOS transistors, |
| 105, 106 | gate electrodes of CMOS source follower circuits, |
| 107, 108 | drain electrodes of NMOS transistors, |
| 109 | power source voltage, |
| 110, 111 | drain electrodes of PMOS transistors, |
| 112 | ground voltage, |
| 113, 114 | output electrodes of a CMOS source follower circuit, |
| 115–118 | input electrodes, |
| 119–122 | comparators, |
| 123–126 | output of comparators, |
| 127–133 | exclusive OR gates, |
| 134, 135 | input electrodes of exclusive OR gates, |
| 201, 202 | CMOS inverters, |
| 203 | gate electrode of CMOS inverter 201, |
| 204 | output of CMOS inverter 201, |
| 205 | output of CMOS inverter 202, |
| 206, 207 | electrodes capacitively coupled with gate electrode 203, |
| 208, 209 | input electrodes, |
| 210–213 | analog switches, |
| 214 | ground electrode, |
| 215 | analog switch, |
| 216–220 | control electrodes for analog switches, |
| 301 | center of gravity detection circuit, |
| 501–504 | input electrodes, |
| 505 | comparator, |
| 506 | output of comparator, |
| 507, 508 | exclusive OR gates, |
| 509 | input electrode for exclusive OR gates, |
| 601, 602 | CMOS source follower circuit, |
| 603, 604 | gate electrodes for CMOS source follower circuit, |
| 605, 606 | output electrodes of CMOS source follower circuit, |
| 607 | first input electrode of comparator, |
| 608, 609 | analog switches, |
| 610 | CMOS source follower circuit, |
| 701–703 | CMOS source follower circuits, |
| 704 | comparator (N − 1), |
| 705–707 | output electrodes for CMOS source follower circuits, |
| 801 | input electrode, |
| 802 | gate electrode of CMOS inverter, |
| 901, 902 | CMOS source follower circuits, |
| 903–904 | output electrodes of CMOS source follower circuits, |
| 1001–1005 | center of gravity detection circuits, |
| 1006–1008 | ΔX detection circuits, |
| 1009–1011 | input electrodes for center of gravity detection circuit 1004, |
| 1101–1103 | electrodes, |
| 1104 | gate electrode of CMOS source follower circuit, |
| 1201 | input gate electrode of CMOS inverter, |
| 1202 | CMOS inverter, |
| 1203, 1204 | second floating gate electrodes, |
| 1205, 1206 | input electrodes. |

Hereinbelow, the present invention will be explained in detain using embodiments; however, it is of course the case that the present invention is no way limited to the embodiments described.

FIRST EMBODIMENT

Figure 1:
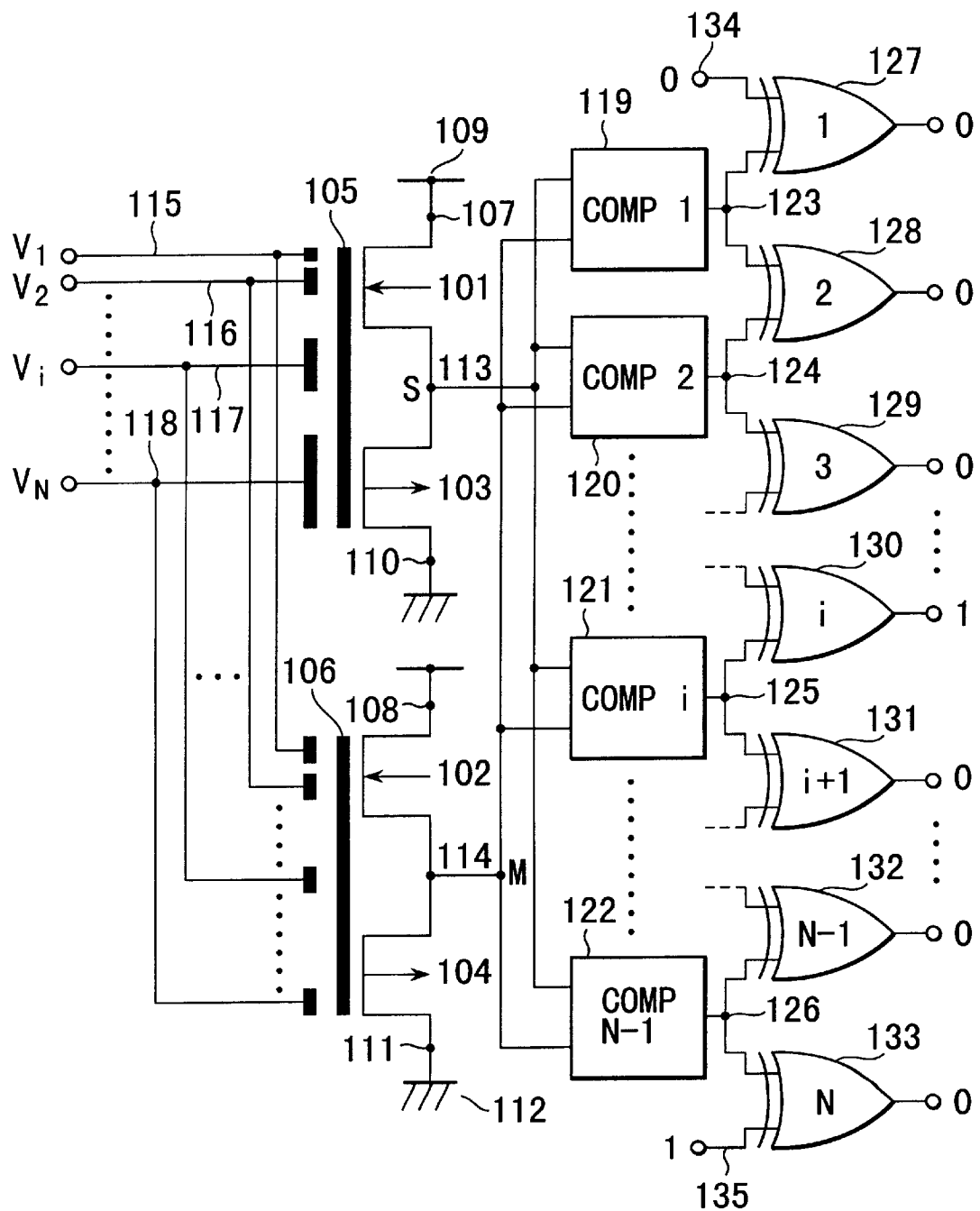
FIG. 1 is a circuit diagram relating to a first embodiment.

FIG. 1 is a circuit diagram showing a first embodiment. References 101 and 102 indicate NMOS transistors, while references 103 and 104 indicate PMOS transistors. References 105 and 106 indicate gate electrodes formed from, for example, $N_+$ polysilicon; gate electrode 105 controls the ON and OFF state of NMOS transistor 101 and PMOS transistor 103, while gate electrode 106 controls the ON and OFF state of NMOS transistor 102 and PMOS transistor 104.

The drains 107 and 108 of NMOS 101 and 102 are connected to a 5 V signal line 109. The drains 110 and 111 of PMOS 103 and 104 are connected to a 0 V signal line 112. The sources of NMOS 101 and PMOS 103 are both connected to electrode 113, while the sources of NMOS 102 and PMOS 104 are both connected to electrode 114. The first input electrode 115 is capacitively coupled with gate electrode 105. The second input electrode 116 is capacitively coupled with gate electrode 105, and the size of this capacitive coupling is twice the size of the capacitive coupling between the first input electrode 115 and the gate electrode 105. Furthermore, the input electrode 117 with the ordinal number i is capacitively coupled with gate electrode 105, and the size of this capacitive coupling is i times the size of the capacitive coupling between the first input electrode 115 and the gate electrode 105. In the same way, the input electrode 118 with the ordinal number N is capacitively coupled with gate electrode 105, and the size of this capacitive coupling is N times the size of the capacitive coupling between the first input electrode 115 and the gate electrode 105. Input electrodes 115–118 are capacitively coupled with gate electrode 106, and the sizes of these capacitive couplings are equal.

References 119–122 are comparators; here, these employ a number reduced by one with respect to the number N of the input electrodes 115–118. Output electrode 113 is connected to the respective first input electrode of comparators 119–122, and output electrode 114 is connected to the respective second input electrodes of comparators 119–122. Comparators 119–122 are provided with, respectively, output electrodes 123–126. Here, references 127–133 are exclusive OR gates; a logical value of 0 is inputted into the first input 134 of the first gate 127, while the output 123 of the first comparator 119 is inputted into the second input. The outputs 123–126 of the comparators 119–122 having the ordinal numbers 1 through (N−1) are inputted into the first inputs of the second through Nth gates, and the outputs 124–126 of the comparators 120–122 having the ordinal numbers 2 through (N−1) are inputted into the second inputs of the gates having the ordinal numbers 2 through (N−1). A logical value of 1 is inputted into the second input 135 of the Nth gate.

Next, the operation of the circuit will be explained. Using the voltages $V_1, V_2, \ldots, V_i, \ldots, V_n$ which are inputted into input electrodes 115–118, this circuit functions as to find, with respect to a value $X^*$ expressed by the following formula:

$$X^* = \left(\sum_{i=1}^{N} i \cdot V_i\right) / \sum_{i=1}^{N} V_i \qquad \text{(Formula 1)}$$

the integer k which is closest to the value $X^*$ among the integers up to the number N of the input electrodes. Here, the integer k is found in the following manner. Formula 1 can be rewritten to produce the following formula.

$$\left(\sum_{i=1}^{N} V_i\right) \cdot X^* = \left(\sum_{i=1}^{N} i \cdot V_i\right) \qquad \text{(Formula 2)}$$

With respect to candidates for values $X^*$ in Formula 2, the calculation (left hand side of Formula 2) − (right hand side of Formula 2) is performed using a number (N−1) of numerical values gi 1.5, 2.5, 3.5, . . . , (N−0.5) with respect to the number N of the input electrodes, and if the value is positive, a logical value of 1 is returned, while if the value is negative, a logical value of 0 is returned. In this manner, a series of (N−1) zeros and ones is generated. A logical value of 1 is added as the Nth value and a series $O_i$ ($1 \leq i \leq N$) having N values of 0 and 1 is created, and initially, the number where the number of $O_i$ is 1 is used as k.

Accordingly, the voltage of gate electrode 105 represents a weighted linear sum, with the respective capacitive coupling ratios as weightings, of input electrodes $V_1, V_2, \ldots, V_i, \ldots, V_n$; that is to say, it becomes the voltage S represented by the right hand side of the equation of Formula 2. Furthermore, the voltage of gate electrode 106 is the voltage M which is expressed by the denominator on the right hand side of the equation in (Formula 1). The circuit comprising NMOS 101 and PMOS 103, and the circuit comprising NMOS 102 and PMOS 104, are CMOS source follower circuits, and the voltages of gate electrodes 105 and 106 are read out in an unchanged manner to outputs 113 and 114. The method by which the voltages of gate electrode 105 and 106 are read out to outputs 113 and 114 in an unchanged manner is not necessarily limited to that shown in the present embodiment.

Figure 2:
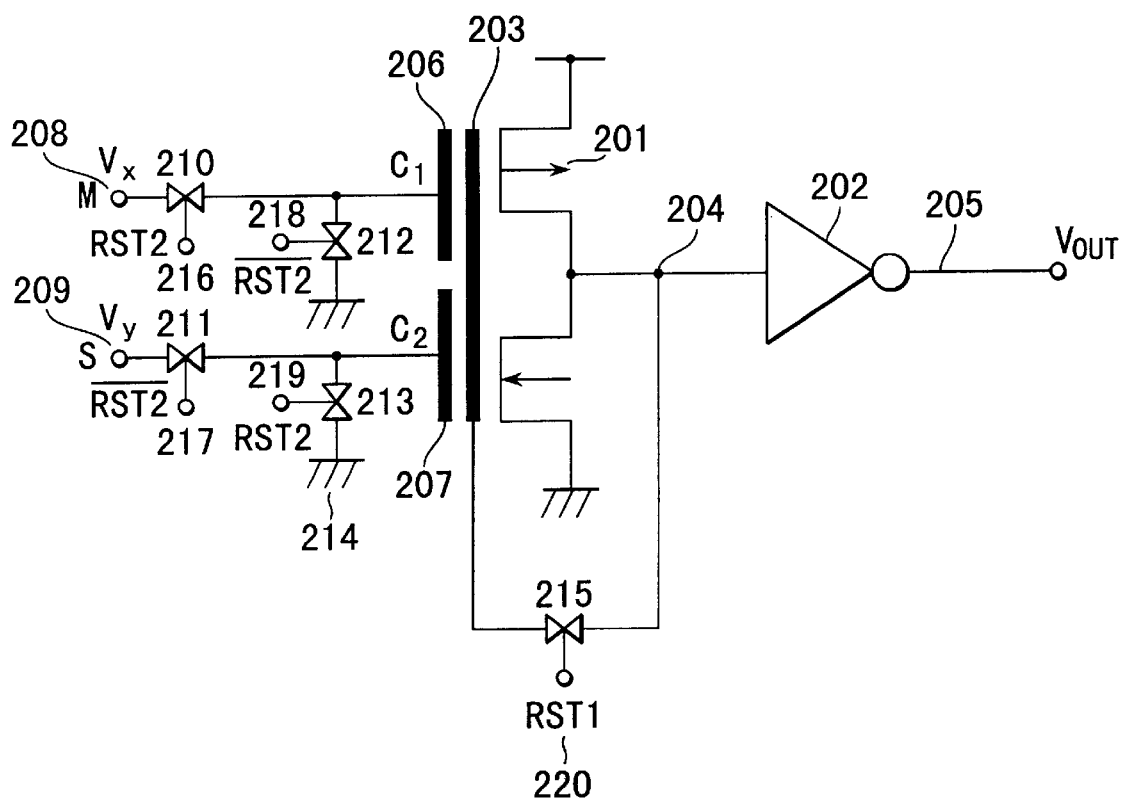
FIG. 2 is a circuit diagram of a comparator relating to the first embodiment.
Figure 2:
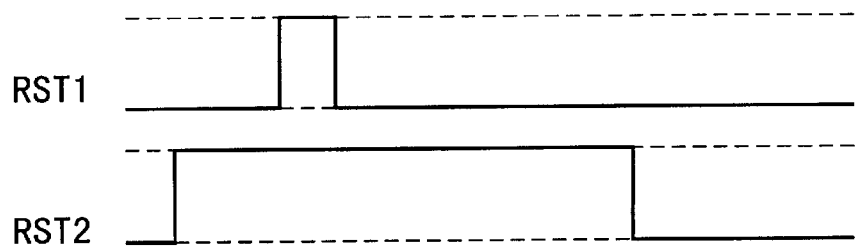

The number (N−1) of comparators 119–122 may be realized by the circuitry shown in FIG. 2. CMOS inverters 201 and 202 have gate electrode 203 and electrode 204, respectively, as inputs, and electrodes 204 and 205, respectively, as outputs. The gate electrode 203 of CMOS inverter 201 is capacitively coupled with electrode 206 and electrode 207, and the sizes thereof are, respectively, f and g. Accordingly, for the arrangement of comparators using the illustrated comparator circuit of FIG. 2, there is provided plural sets of capacitance sizes (f,g) each corresponding to one of the comparator circuits. In one form of the comparator arrangement, there is defined a relationship among the comparator circuits involving the ratio g/f, wherein such ratio for the jth one of the plural sets of capacitance sizes is greater than such ratio for the (j−1)th one of the plural sets by a fixed amount.

Input voltages $V_X$ and $V_Y$, respectively, are inputted into input electrodes 208 and 209, and these are connected with electrodes 206 and 207 via, respectively, switches 210 and 211. Electrodes 206 and 207 are connected to electrode 214, which is here at the ground potential, via, respectively, switches 212 and 213. It is not absolutely necessary that electrode 214 be at the ground potential. Electrode 203 is connected with electrode 204 via switch 215. Control electrodes 216–220 which control the ON/OFF state of switches 210–213 and 215 are provided, and control is conducted here so that a logical value of 1 represents the ON state, while a logical value of 0 represents the OFF state. Here, the signal RST1 is inputted into control electrode 220, the signal RST2 is inputted into control electrodes 216 and 219, and the inversion signal of signal RST2 is inputted into control electrodes 217 and 218. It is of course the case that the method of clock control and the method of construction of the switching element are not necessarily limited to those described in the present embodiment.

With respect to the operation of the circuit, with respect to input voltages $V_X$ and $V_Y$ and the capacitive coupling sizes f and g, $gV_Y − fV_X$ is calculated, and if the result thereof is positive, a logical value of 1 is outputted to electrode 205, while if the value thereof is negative, a logical value of 0 is outputted to electrode 205. That is to say, by setting control signal RST2 to 1, the voltages of electrodes 206 and 207 are set to, respectively, $V_X$ and 0 V. While maintaining this state, the control signal RST1 is set to 0 after being set to 1. At this time, the voltages of the gate electrode 203 and the output electrode 204 of CMOS inverter 201 are equalized. Furthermore, by setting control signal RST2 to 0, the voltages of electrodes 206 and 207 are set to, respectively 0 V and $V_Y$, and when this is done, a logical value of 0 or 1 which is determined by the calculations is outputted to the output electrode 204 of the circuit. The circuit structure is not necessarily limited to that shown in the present embodiment.

Accordingly, with respect to the number (N−1) of comparators 109–122 shown in FIG. 1, the voltage S is inputted into the first input thereof, while the voltage M is inputted into the second input thereof. The capacitive coupling size g of the number (N−1) of comparators is expressed using a number (N−1) of numerical values $g_i$. Accordingly, outputs 123–126 of the (N−1) comparators output, respectively, up to the value having the ordinal number (N−1) of the series $O_i$ ($1 \leq i \leq N$). Furthermore, the number N of exclusive OR gates 127–133 use the number k, and a logical value of 1 is outputted to the output of the exclusive OR gate having the ordinal number K, while a logical value of 0 is outputted to the other (N−1) outputs.

Figure 3:
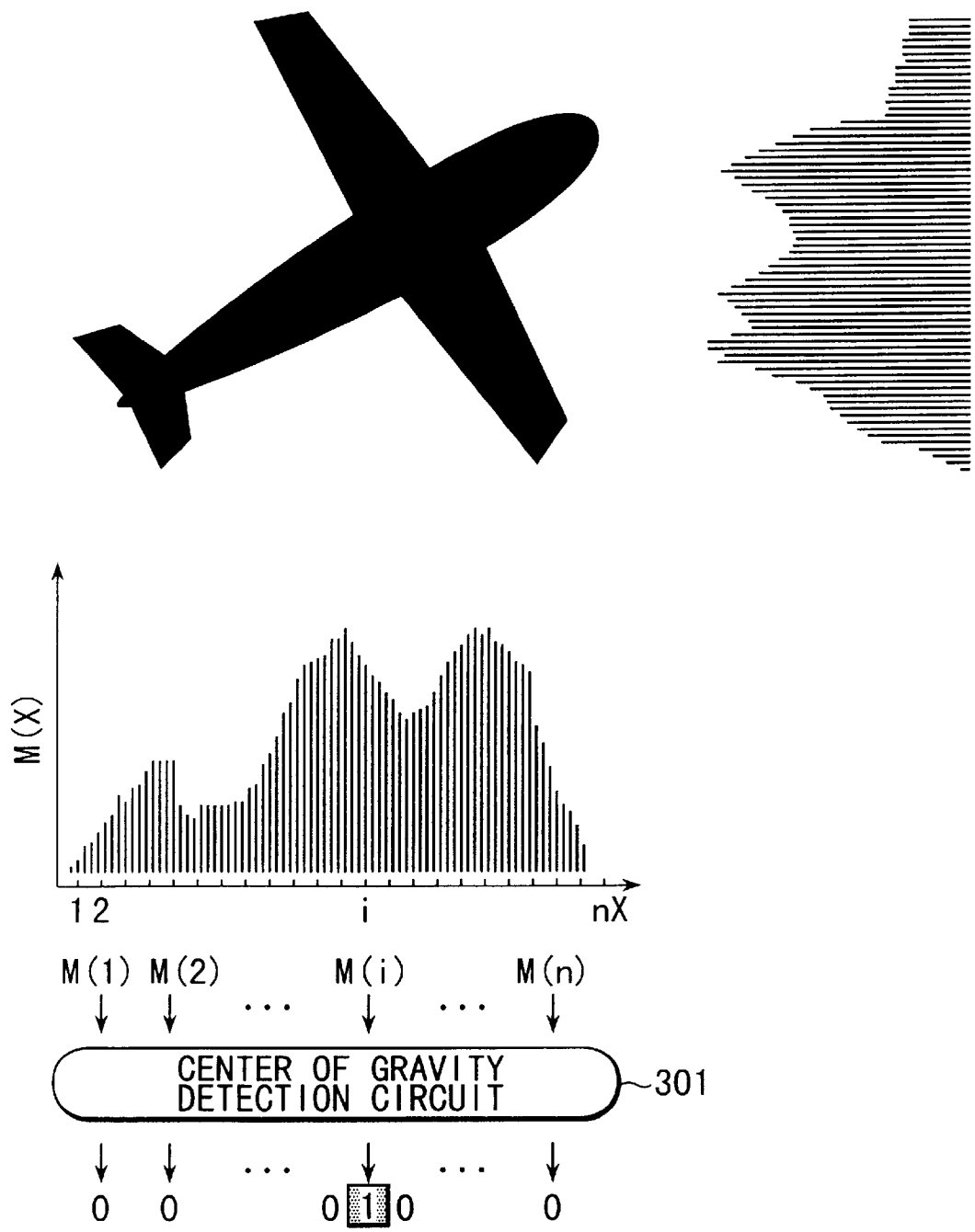
FIG. 3 is an example of a realization of a system in accordance with the first embodiment.

As is shown in FIG. 3, by inputting, into the circuit shown in FIG. 1, analog data projected along the vertical axis and horizontal axis with respect to an image consisting of a number of pixels N horizontally and a number of pixels L vertically, it is possible to calculate the center of gravity along the vertical and horizontal axis. With respect to the means for generating analog data projected along the vertical and horizontal axis, this may be easily realized utilizing amps or light receiving elements employing bi-polar or MOS, so that an explanation thereof is omitted here. The projected data are essentially equivalent along the vertical axis and the horizontal axis with the exception that the data length differs, so that only the case of projection along the vertical axis will be considered.

Now, when the projected analog data are expressed as M(1), M(2), . . . , M(N) and these are inputted into the circuit 301 explained in FIG. 1, a logical value of 1 is outputted only at the position of the center of gravity of the image in the horizontal direction.

Figure 4A:
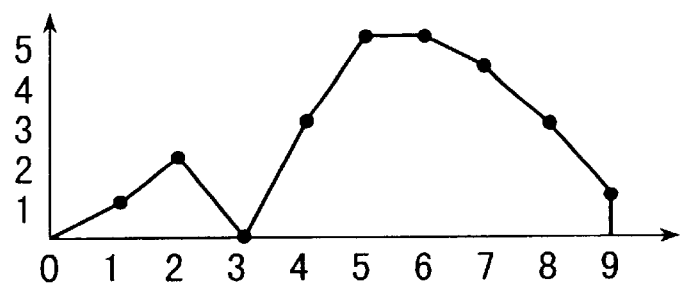
FIGS. 4 (*a*) and 4 (*b*) shows the results of a simulation in the circuit of the first embodiment.
Figure 4B:
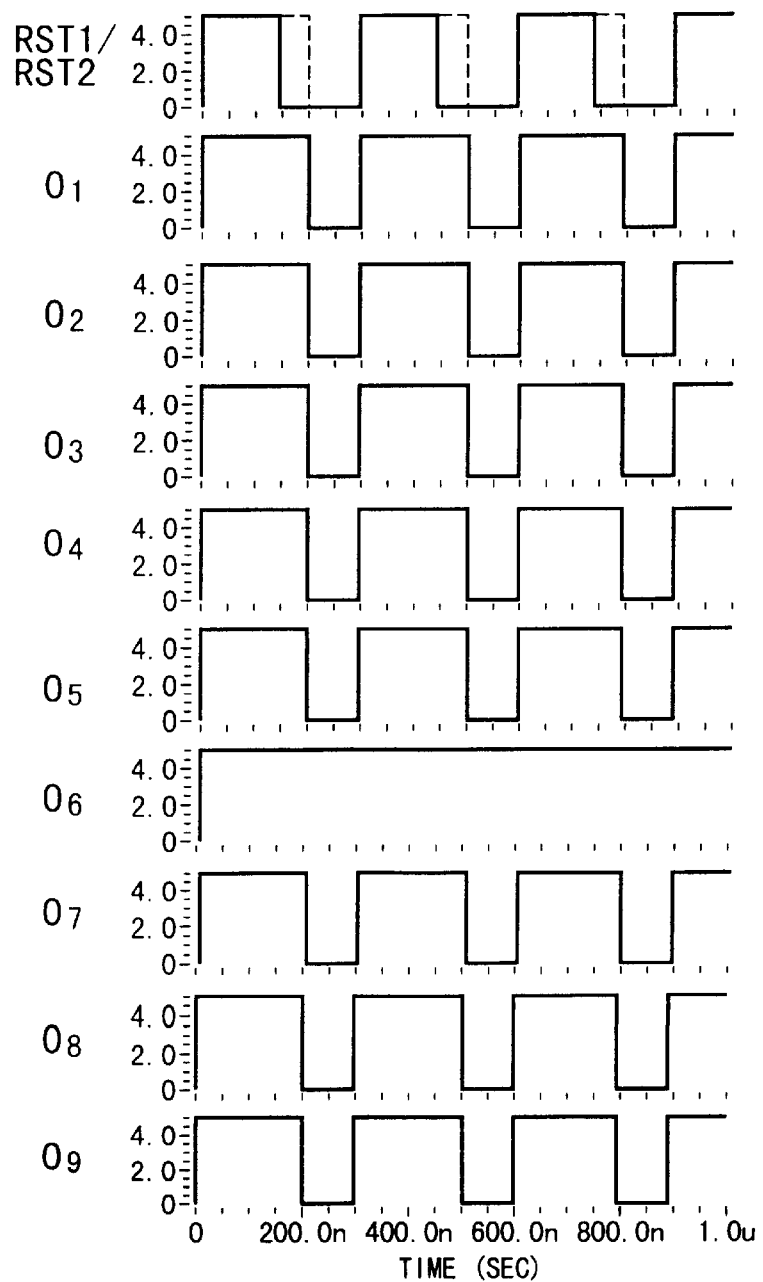

The operation of the circuit with respect to the case in which N=9 was confirmed using HSPICE. The data inputted into the circuit at this time are shown in FIG. 4(-*a*). These inputted data result in a center of gravity at the sixth position; here, as shown in FIG. 4(-*b*), the output of the circuit is obtained when RST1 and RST2 have a value of 0, but only the output $O_6$ corresponding to the sixth position outputs a value of 1 during this period, and it can be seen that the other outputs have a value of 0. In this way, it is possible to realize a circuit which is capable of calculating the center of gravity of image data in real time and with a high degree of accuracy.

Here, the number of inputs and the number of outputs were set to the same number N; however, these need not be similar. For example, the number of inputs may be set to 100 and the number of outputs may be set to 500, and the number of comparators (119 etc.) of the decision part may be increased. At this time, the capacitive coupling of the input portions of the comparators may be similar to that of the present embodiment. By means of doing this, it is possible to determine the position of the center of gravity with greater accuracy. Furthermore, the output need not be made more detailed with respect to all the input pixels 1 to 100; for example, the output may be made 5 times more detailed only with respect to the input numbers 40 to 60. That is to say, with respect to input numbers 1 to 39 and 61 to 100, the output may correspond in a one to one manner to the input, while 5 outputs may correspond to each input in the input range 40 to 60. By means of this, the position of the center of gravity can be established with particular accuracy when the center of gravity is in the central portion. Furthermore, it is of course the case that the positions corresponding to a plurality of outputs are not restricted to the central portion.

Furthermore, the number of comparators may be reduced in correspondence with the number of inputs. For example, 10 outputs may be used with respect to inputs 1 to 100. This is extremely effective in the case of, for example, a robot eye or the like which instantaneously perceives the general center of an image; by reducing the number of comparators, the hardware is reduced in size, and a higher degree of integration becomes possible.

Presently, in order to conduct data processing in which calculations such as the sum of products and division are conducted in order with respect to inputted data expressed as analog values, it is first necessary to subject the analog values to A/D conversion, and after this, to conduct an enormous number of 4-rules calculations using a computer, so that it is impossible to obtain the result in real time. However, if the semiconductor operational circuit which has been invented is employed, it is possible to realize such calculations using simple circuitry such as that shown in FIG. 1, and it is, moreover, possible to conduct calculations at high speed. Accordingly, the present invention is extremely important in that it makes possible effects which were heretofore not possible.

SECOND EMBODIMENT

Figure 5:
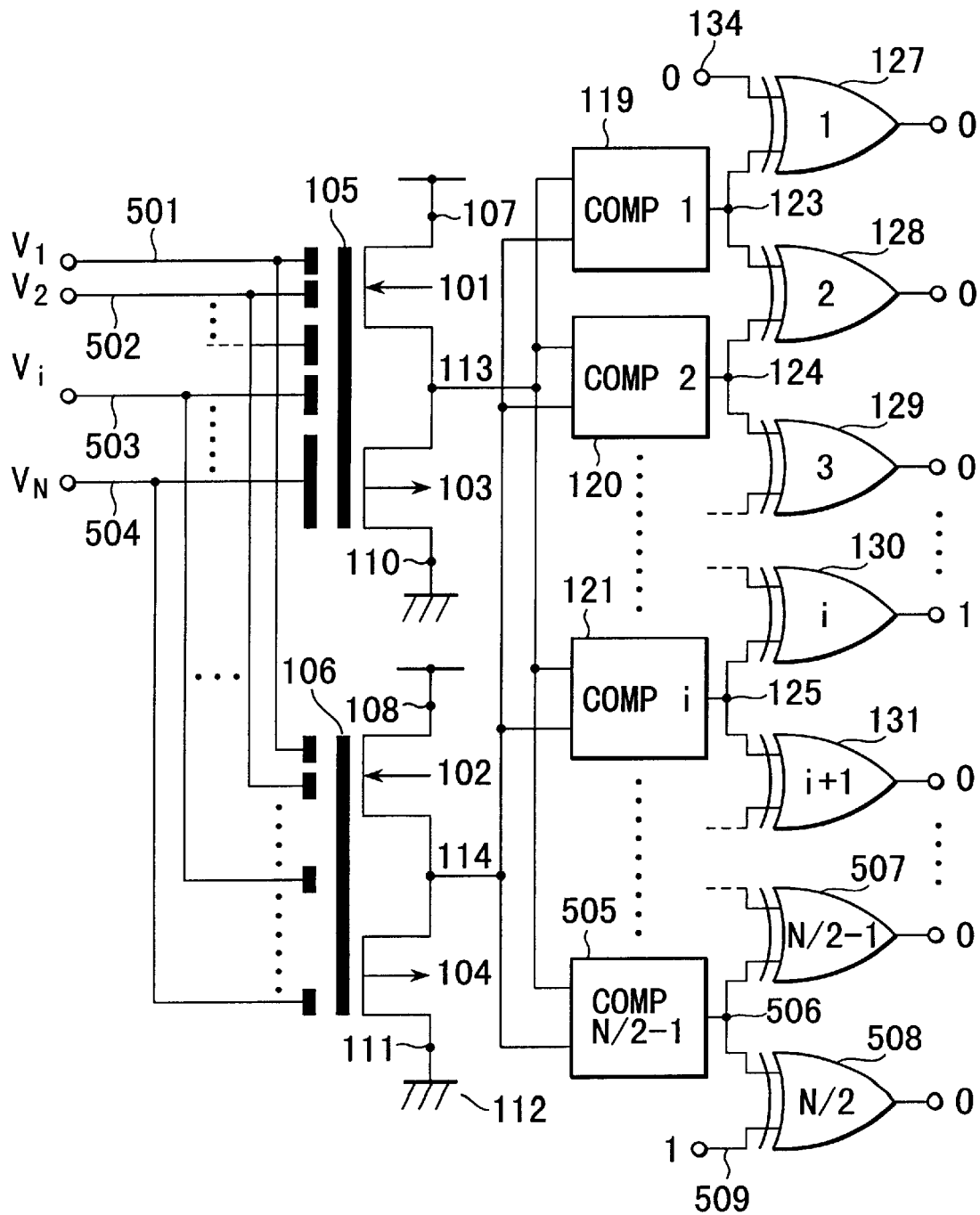
FIG. 5 is a circuit diagram relating to a second embodiment.

FIG. 5 is a circuit diagram showing a second embodiment. Parts similar to those in the first embodiment are given the same reference numbers. References 501–504 indicate a number N of input electrodes; the values $V_1, V_2, \ldots, V_i, \ldots V_n$ are inputted into these respectively. Here, N is an even number. With respect to an integer P, N is a multiple of P. In accordance with the fact that N is an even number, that is to say, here, P=2, with respect to the capacitive coupling size between the number N of input electrodes 501–504 and the gate electrode 105, using an integer j, the size at the gate electrodes having the ordinal numbers 2j and (2j −1) is set at j. The size of the capacitive coupling between the number N of input electrodes 501–504 and gate electrode 106 may be equivalent to that in the first embodiment. References 119–121 and 505 indicate a number (N/2−1) of comparators. Here, the respective comparators are similar to those in the first embodiment, and only the number of comparators is different. In the same manner, with respect to the exclusive OR gates as well, the number (N/2) of these gates 127–131 and 507 and 508 are similar to those in the first embodiment. Here, a logical value of 1 is inputted into electrode 509.

Next, the function of the circuit will be explained. In contrast to the first embodiment, in this circuit, the size of the capacitive couplings between input electrodes 501–504 and gate electrode 105 differ, and the capacitive coupling size increases after every number of electrodes P. Accordingly, it is possible to obtain the average value after every number of electrodes P, and determine in which group the center of gravity is present when the inputs are divided into a number of groups (N/P). Accordingly, the number of comparators provided corresponding to the number of groups (N/P) is (N/P−1).

THIRD EMBODIMENT

Figure 6:
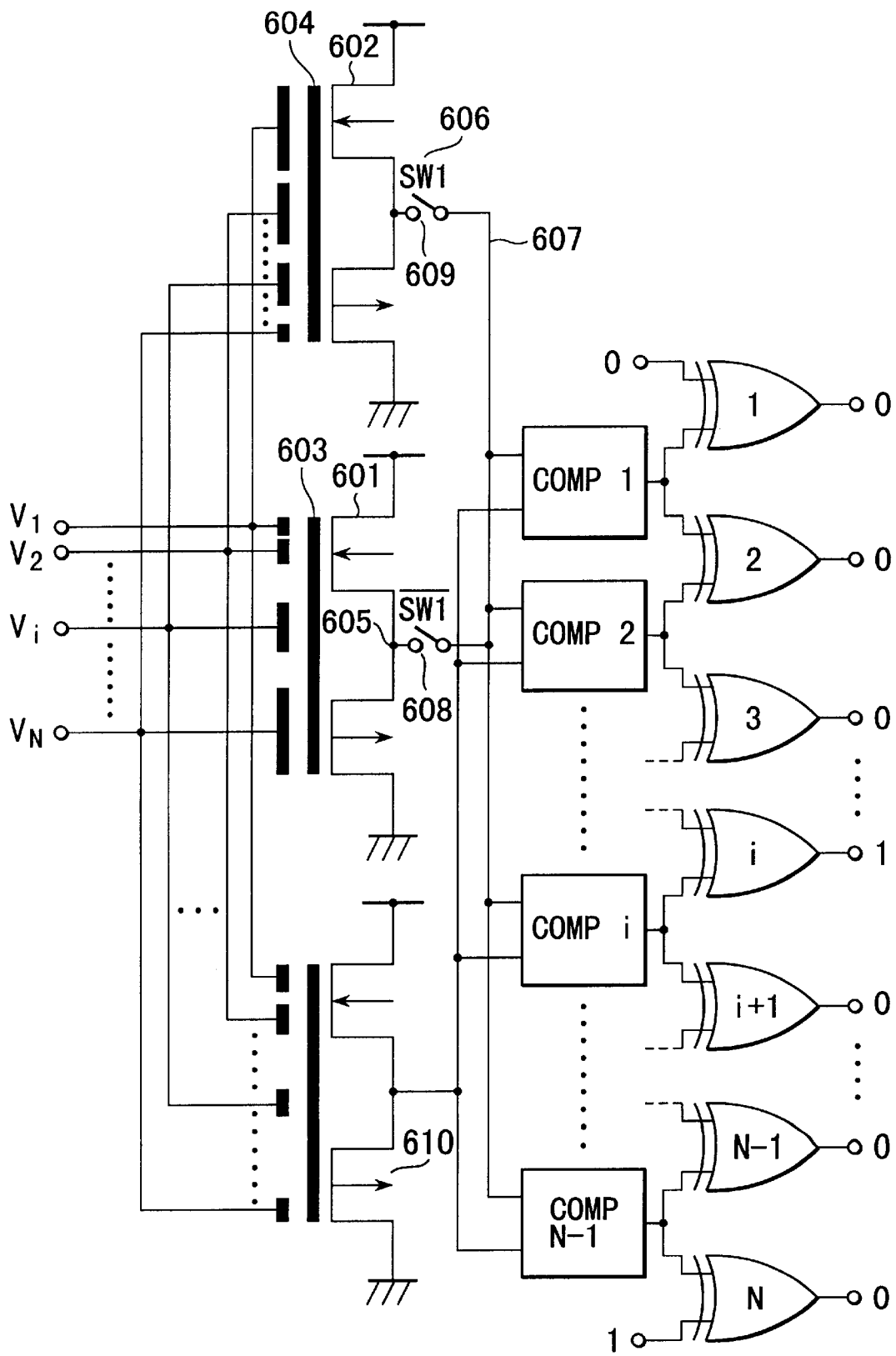
FIG. 6 is a circuit diagram relating to a third embodiment.

FIG. 6 is a circuit diagram showing a third embodiment. This embodiment has a structure which is almost similar to that of the first embodiment. Accordingly, only the structure and operation of the portions which are changed will be explained. References 601 and 602 are CMOS source follower circuit these have inputs 603 and 604, respectively, and outputs 605 and 606, respectively. CMOS source follower circuit 601 is similar to a circuit which outputs a voltage S defined by the number N of input voltages. Here, the voltage of output 605 is renamed S1. CMOS source follower circuit 602 is similar to the circuit which outputs a voltage S defined by the number N of input voltages; however, in contrast to CMOS source follower circuit 601, into which the input voltages are inputted in order from the smallest number, input is conducted into CMOS source follower circuit 602 starting with the larger input voltage numbers. The output electrodes 605 and 606 of CMOS source follower circuits 601 and 602 are connected, via switches 608 and 609, with the first input electrode 607, which is itself connected with a number (N−1) of comparators. Here, control signal SW1, and the inversion signal of SW1, respectively, are inputted into the control electrodes of switches 608 and 609. The method of clock control and the construction method of the switching elements are of course not necessarily limited to those described in the present embodiment. Accordingly, when control signal SW1 has a value of 0, the circuit functions in a manner similar to that of the circuit shown in the first embodiment, and when control signal SW1 has a value of 1, the circuit carries out operations similar to those when the input or the circuit is inverted. Furthermore, using a plurality of outputs when SW1 is switched, it becomes possible to conduct the detection of the center of gravity with a higher degree of accuracy. Furthermore, a plurality of circuits of the same type as CMOS source follower circuit 602 may be provided, and it is of course the case that a plurality of circuits of the same type as CMOS source follower circuit 610 may also be provided.

FOURTH EMBODIMENT

Figure 7:
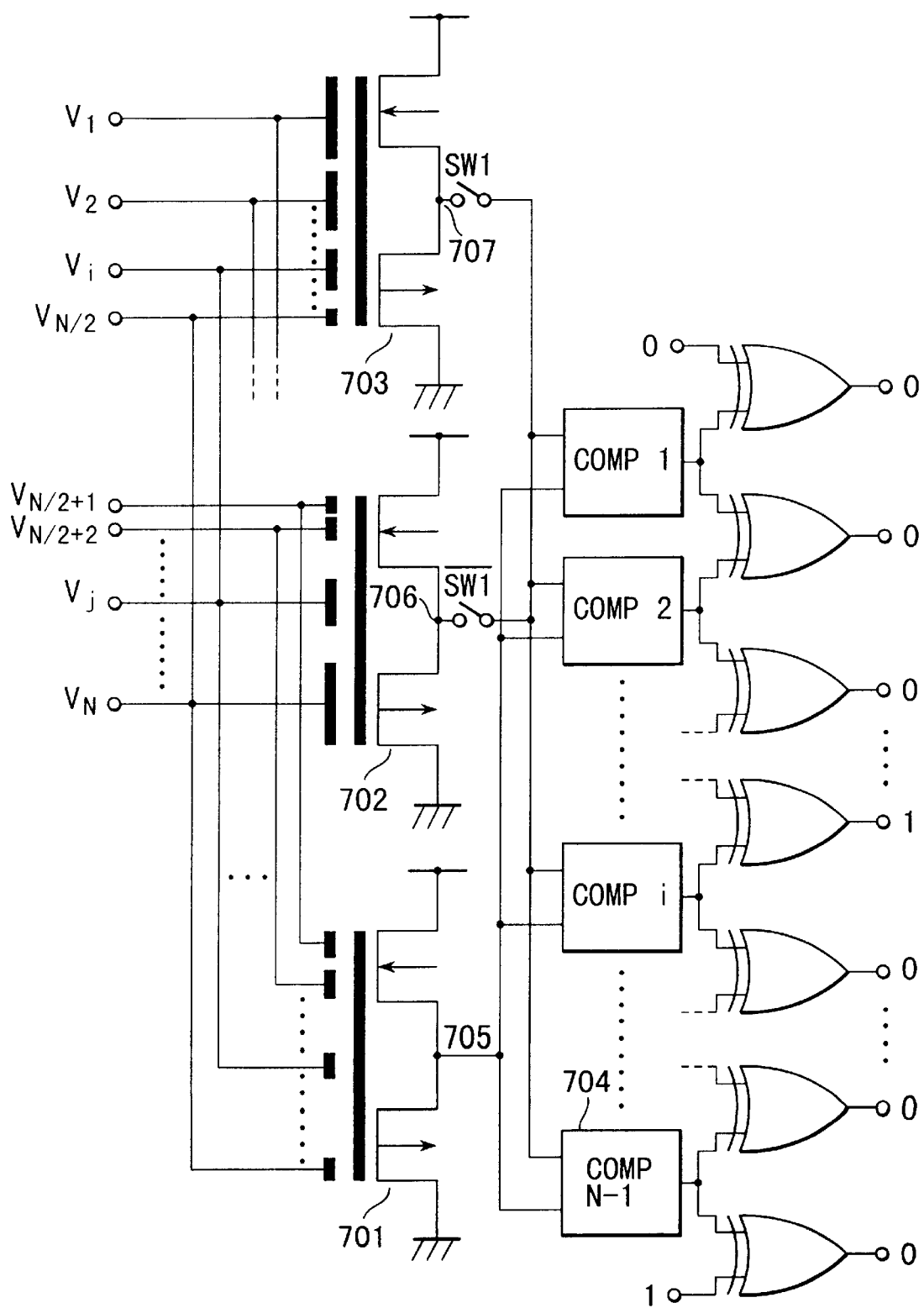
FIG. 7 is a circuit diagram relating to a fourth embodiment.
Figure 8:
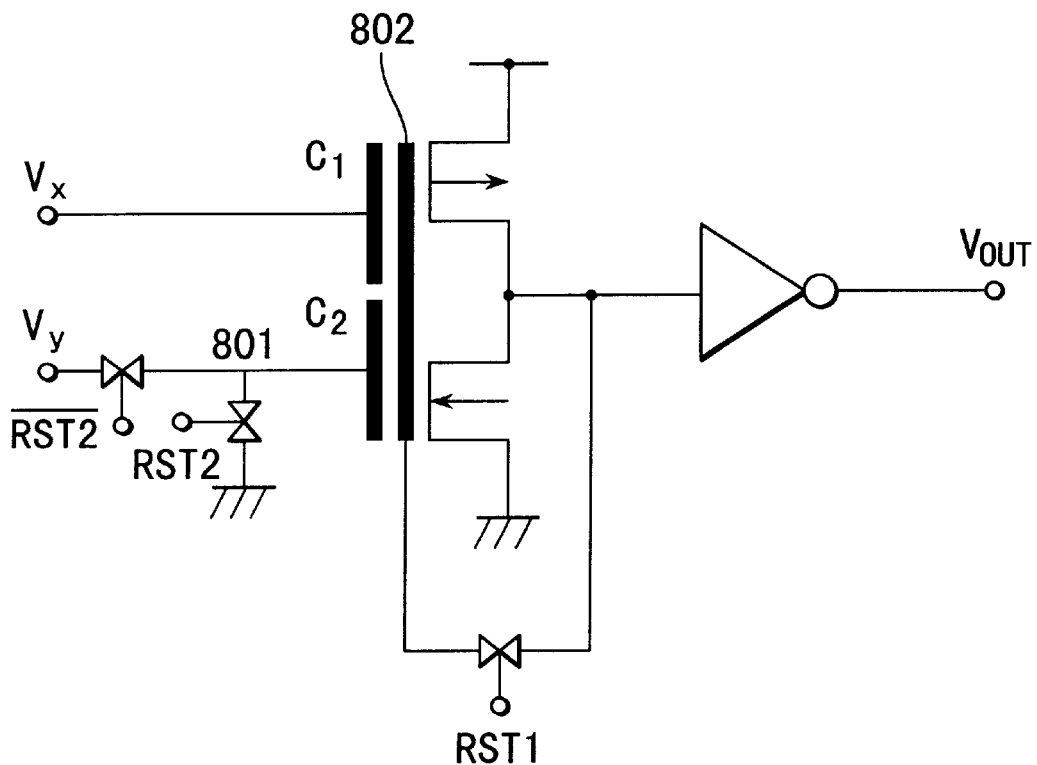
FIG. 8 is a circuit diagram of a comparator relating to the fourth embodiment.
Figure 8:
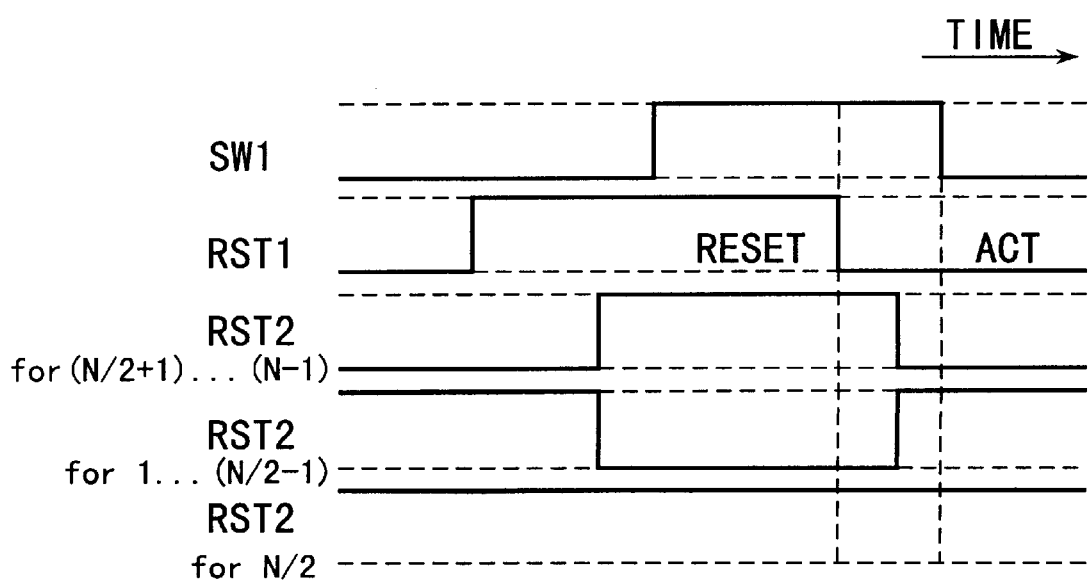

FIG. 7 shows a fourth embodiment. This embodiment has a structure which almost similar to that of the third embodiment. Accordingly, only the structure and operation of those portions which have changed will be explained. In FIG. 7, CMOS source follower circuits 701, 702, and 703 correspond structurally to the CMOS source follower circuits 610, 601, and 602 in FIG. 6. The capacitive coupling between the gate electrode of CMOS source follower circuit 701 and each input electrode is similar to that of the CMOS source follower circuit 610. With respect to CMOS source follower circuits 702 and 703, the input electrodes are divided into two groups, and these groups consist of a number of electrodes (N/2), where N represents an even number. Furthermore, as shown in FIG. 8, a comparator 704 having the ordinal number (N−1) is employed in which the switches 210 and 212 connected to the electrode 206 in FIG. 2 are removed. Furthermore, the number j is an integer up to (N/2−1), and the size of the capacitive coupling between the electrode 801 and gate 802 in the comparators having the ordinal numbers (N/2+j) and (N/2−1) is proportional to j.

The voltages of the output electrodes 705, 706, and 707 of CMOS source follower circuits 701, 702, and 703 are, respectively, M, S+, and S−. In the state in which control signal RST1 has a value of 1, control signal SW1 has a value of 1, and RST2 has a value of 0 in the comparators having the ordinal numbers one through (N/2−1), while RST2 has a value of 1 in the comparators having ordinal numbers from (N/2+1) to (N−1). While maintaining this state, the value of RST1 is set to 0, the comparators are placed in a state in which they are capable of calculations, and control signals RST1 and RST2 are inverted, and thereby, logical values of 0 or 1 are determined. The electrode 801 having the ordinal number (N/2) is made so as to maintain a constant voltage. RST2 may be permanently set to a value of 1. By means of this, it is possible to reduce the total coupling capacitance connecting the gate electrodes of CMOS source follower circuits 702 and 703, and it thus becomes possible to obtain a higher accuracy of calculation.

FIFTH EMBODIMENT

Figure 9:
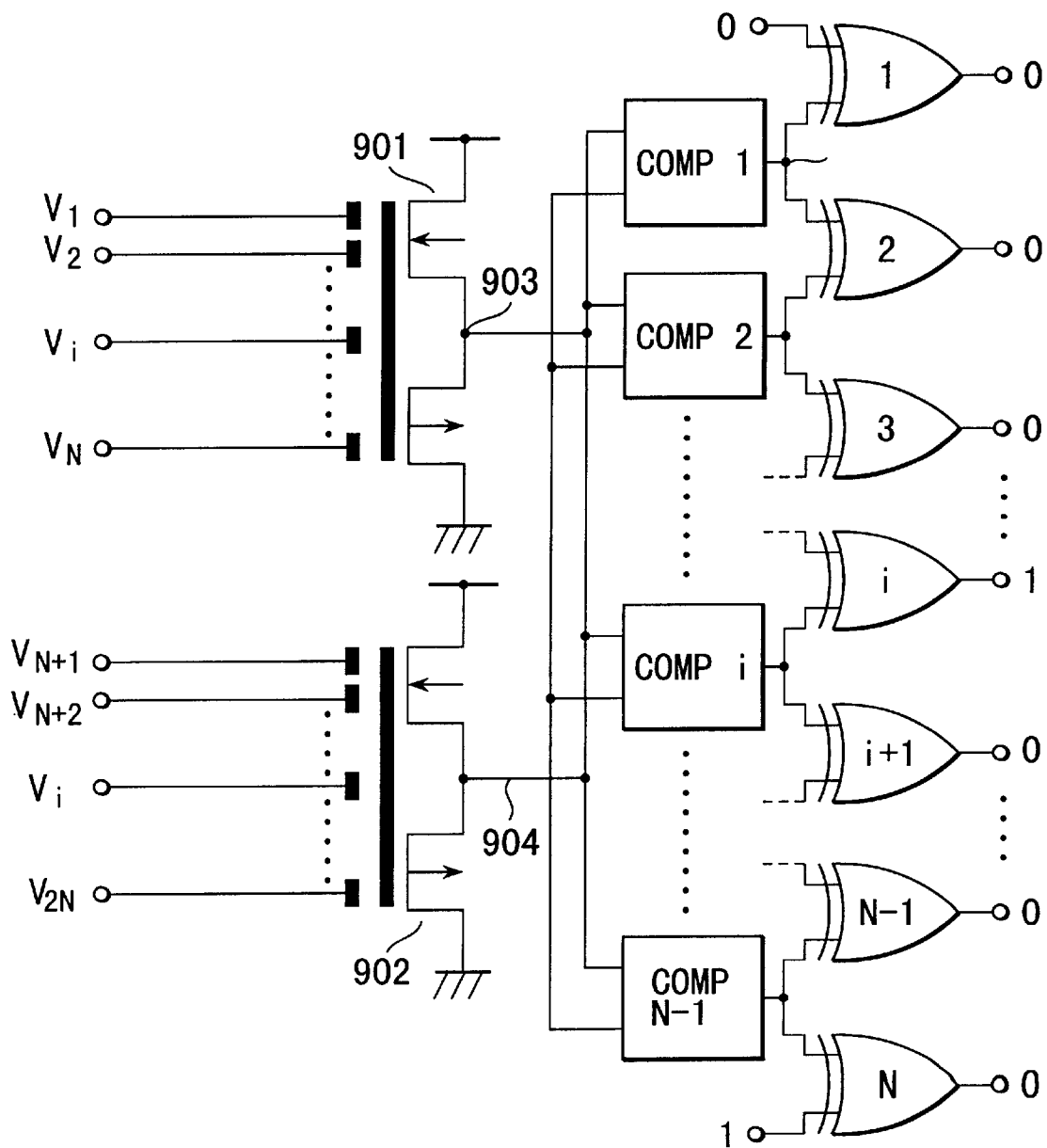
FIG. 9 is a circuit diagram relating to a fifth embodiment.

FIG. 9 is a circuit diagram showing a fifth embodiment. This embodiment has a structure which is almost similar to that of the first embodiment. CMOS source follower circuits 901 and 902 each have a number N of differing input electrodes which are capacitively coupled with the gate electrodes thereof, and the coupling capacitancies thereof are all equivalent. By means of this, with respect to the voltages A and B of output electrodes 903 and 904 of the CMOS source follower circuits 901 and 902, respectively, it is possible to obtain the integer which is closest to A/B.

SIXTH EMBODIMENT

Figure 10:
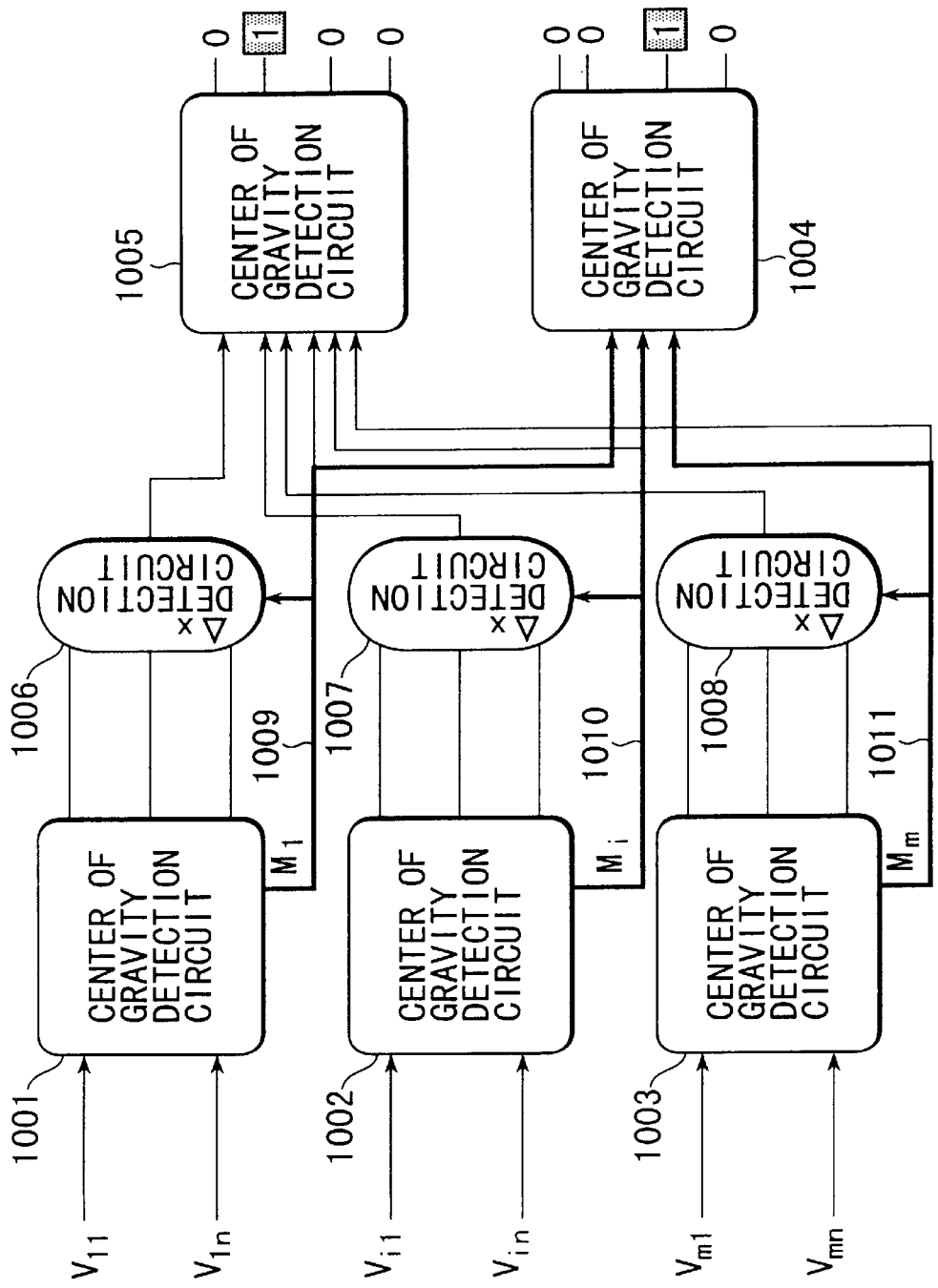
FIG. 10 is a circuit diagram relating to a sixth embodiment.

FIG. 10 is a circuit diagram showing a sixth embodiment. Here, center of gravity detection circuits 1001–1004 are the circuits shown in FIG. 1, and center of gravity detection circuit 1005 is the circuit shown in FIG. 9. Using m and n, which are positive integers, a number m of center of gravity detection circuits 1001–1003 has a number n of input electrodes $V_{l1}$–$V_{ln}$, $V_{i1}$–$V_{in}$, and $V_{m1}$–$V_{mn}$. Furthermore, a number n of output electrodes are provided, respectively, and these are inputted into the following stage Δx detection circuits 1006–1008. The number m of electrodes 1009–1011 are the output electrodes from center of gravity detection circuits 1001–1003, and correspond to the electrode 114 of the circuit shown in FIG. 1. The number m of electrodes 1009–1011 form the input electrodes of center of gravity detection circuit 1004. Furthermore, these are also inputted into Δx detection circuits 1006–1008. The number m of outputs of Δx detection circuits 1006–1008 form the inputs of center of gravity detection circuit 1005. In particular, these are inputted into electrodes capacitively coupled with the gate electrode of CMOS source follower 901 shown in FIG. 9. The number m of electrodes 1009–1011 are connected to the other electrode.

Accordingly, an output proportional to the sum $M_j$ of the voltages of each group appears in the number m of electrodes 1009–1011, so that the center of gravity detection circuit 1004 detects the number of the group, among an number m of groups containing inputs, containing the center of gravity with respect to the number of inputs mn of the circuit as a whole.

On the other hand, center of gravity detection circuit 1005 specifies the position within the group where the center of gravity is present. First, the Δx detection circuit will be explained.

Figure 11:
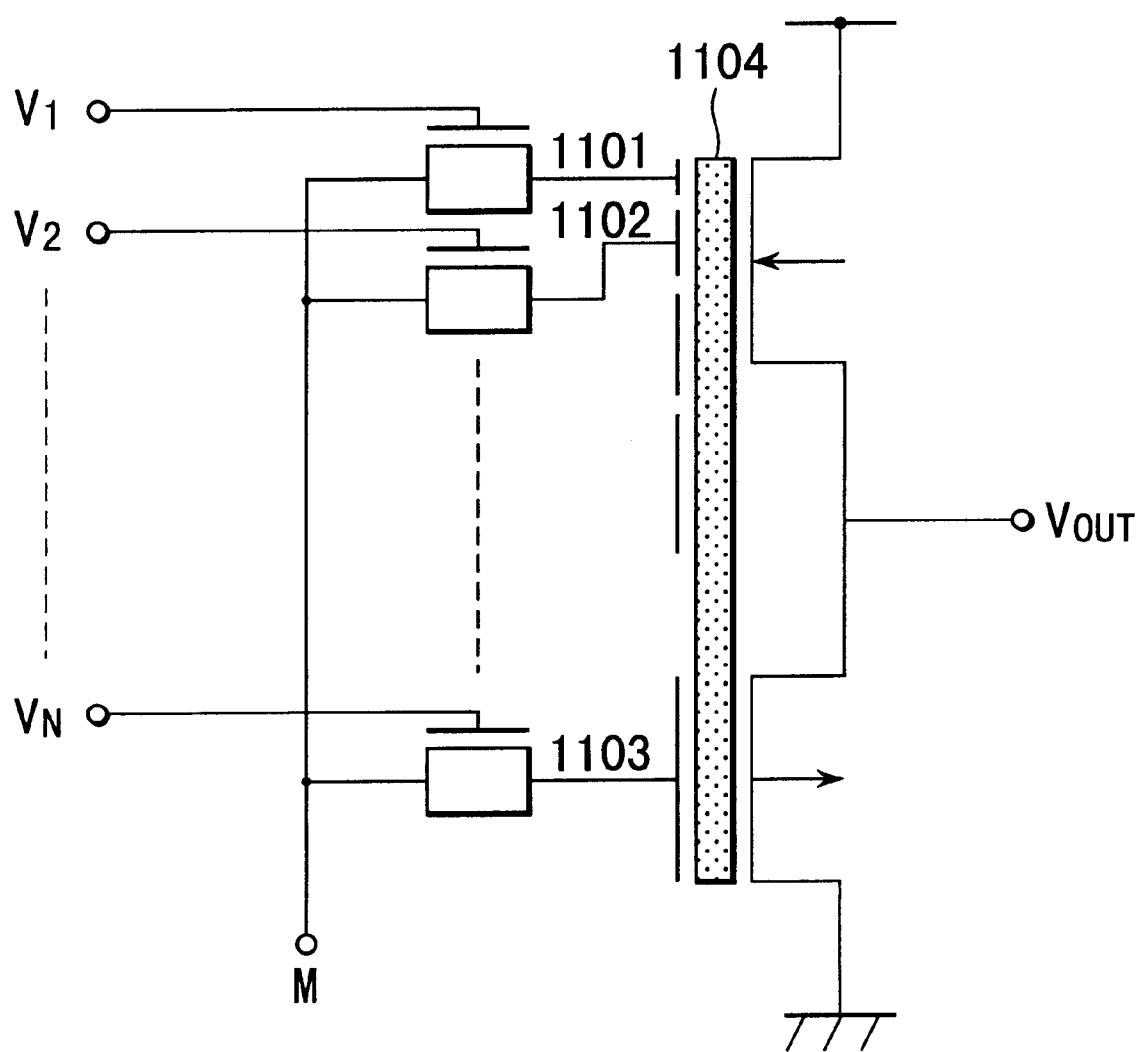
FIG. 11 is a circuit diagram of a Δx detection circuit in accordance with the sixth embodiment.

FIG. 11 is a circuit diagram of Δx detection circuits 1006–1008. The voltages of a number N of electrodes 1101, 1102, and 1103 are controlled by the 0 and 1 values of the $V_1$, $V_2$, $V_n$ of a number N of input electrodes. That is to say, when the input voltage $V_i$ having the ordinal number i has a logical value of 0, then a value of 0 V appears in the electrode having the ordinal number i, while when $V_i$ has a logical value of 1, the analog voltage N appears in the electrode having ordinal number 1. The size of the coupling capacitance between the electrodes 1101–1103 and the gate electrode 1104 of the CMOS source follower circuit is proportional to i, with respect to the electrode having the ordinal number i. Here, the output of the center of gravity detection circuits is inputted into this circuit, and normally only one logical value of 1 is produced. Accordingly, in this circuit, the output is given by the following formula.

$$V_{out} = i \cdot M \qquad \text{(Formula 3)}$$

Furthermore, the position y within the group at which the center of gravity is present is represented by the following formula.

$$y = \left(\sum_{j=1}^{m} \Delta x_j \cdot M_j\right) \bigg/ \left(\sum_{j=1}^{m} M_j\right) \qquad \text{(Formula 4)}$$

Here, $\Delta x_j \cdot M_j$ is the output voltage of the Δx detection circuit having the ordinal number j which is represented by Formula 3. Accordingly, in center of gravity detection circuit 1005, if the sum of the outputs of Δx detection circuits 1006–1008 is represented by A, and the sum of the outputs $M_j$ of center of gravity detection circuits 1001–1003 is represented by B, then it is possible to output, as the output of circuit 1005, the position y within the group at which the center of gravity is present. By means of this circuit, it is possible to employ a center of gravity detection circuit having a limited number of inputs to detect the center of gravity of a plurality of inputs.

SEVENTH EMBODIMENT

A seventh embodiment will be explained using FIGS. 1 and 2. A CMOS source follower circuit having gate electrodes 105 and 106 is not absolutely necessary. That is to say, in this case, in comparators 119–122, the coupling capacities f and g depicted in FIG. 2 may be divided by the capacitive coupling ratio between the input electrodes and the gate electrodes 105 and 106, and the input electrodes may be directly inputted into the respective comparators.

EIGHTH EMBODIMENT

An eighth embodiment will be explained using FIGS. 1, 2, and 12. The fact that a CMOS source follower circuit having gate electrodes 105 and 106 is not absolutely necessary was described in the seventh embodiment above. However, in the case of the seventh embodiment, in comparators 119–122 it was necessary to divide the coupling capacitances 206 and 207 shown in FIG. 2 so as to be finer, and there was thus a problem in that it is was necessary to increase the surface area of the circuit in order to guarantee a constant accuracy in the calculations. The structure of a comparator which solves this problem will now be described.

Figure 12:
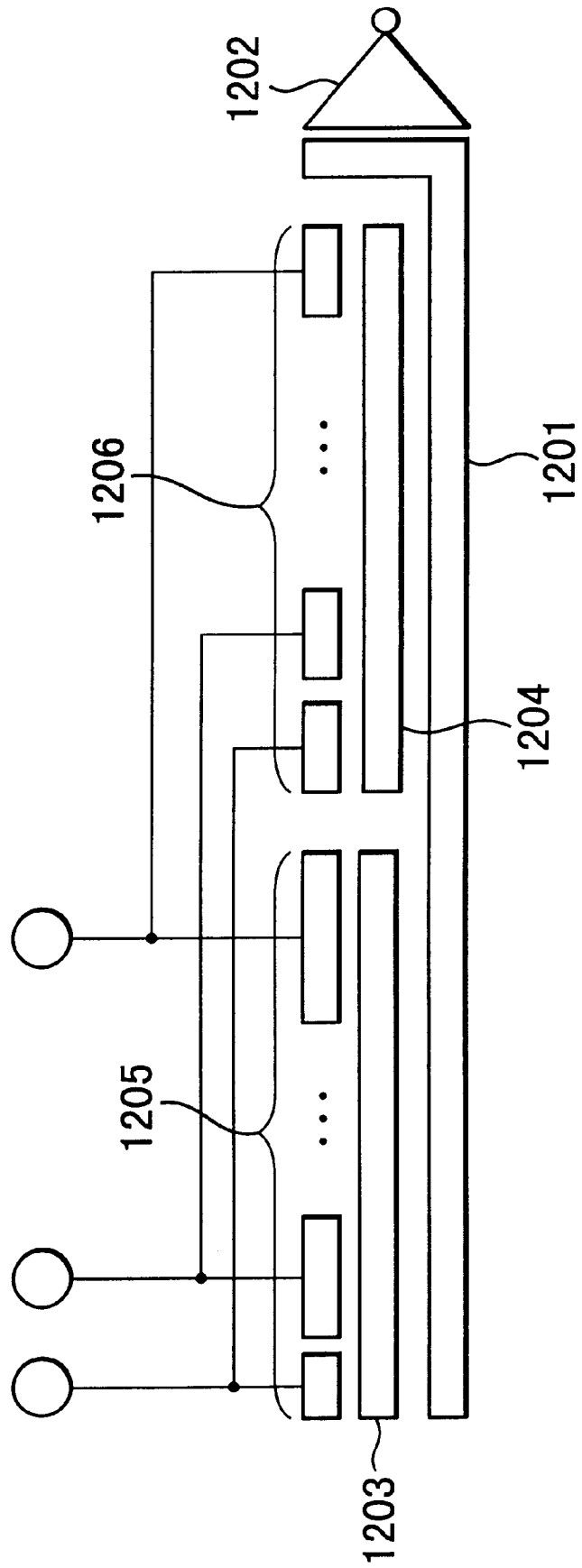
FIG. 12 is a circuit diagram of a comparator in accordance with an eighth embodiment.

The structure of comparators 119–122 which serve to permit the removal of the CMOS source follower circuit having floating gates 105 and 106 in FIG. 1 is modified as shown in FIG. 12. The first floating gate electrode 1201 is the input electrode of CMOS inverter 1202; this corresponds to gate electrode 203 in FIG. 2. Electrode 1203 and electrode 1204 are capacitively coupled with electrode 1201, and these are placed in an electrically floating state. Accordingly, electrodes 1203 and 1204 are termed the second floating gate electrodes. Furthermore, the capacitive coupling ratio is set so as to be the same as the capacitive coupling ratio between the electrodes 206 and 207 and the gate electrode 203 in FIG. 2. Furthermore, the coupling capacitance of input electrode groups 1205 and 1206 is set so as be similar to the coupling capacitance between the input electrode 115–118 and electrodes 105 and 106 in FIG. 1.

By modifying the structure of the comparators as shown in FIG. 12, input voltages V1–VIII appear in electrode 1201 as voltage values which are proportional to the product of the coupling capacitance of the first floating gate and the coupling capacitance of the second floating gate. Accordingly, it is possible to realize functions similar to those of the first embodiment with the use of a source follower circuit, and the number of divisions of the capacitance can be held at a small value. Furthermore, although it is not employed here, it is possible to employ a switching transistor for charge cancellation at each floating gate. Furthermore, it is of course the case that it is possible to increase the number of second floating gate electrodes such as electrodes 1205 and 1206, and it is also possible to provide a number of levels of floating gate electrodes, such as second and third floating gate electrodes.

Here, the present invention was described in a manner centering on an application which determines the center of gravity of an image of a moving object. However, the applications of the present invention are not necessarily so limited. For example, this invention may be applied to a moving object against a static background. For example, if the difference between pixels is calculated with respect to images from two frames taken over a continuous period of two hours, signals will appear only where there is motion. A particularly large signal appears in edge portions of moving objects. By means of this, it is possible to detect a moving object, to conduct a conversion to a binary format in which all of the moving object is colored black, and to determine the center of gravity of the black object against a white background using the circuit of the present invention.

Furthermore, the present circuit is not restricted to the detection of the center of gravity of images. For example, it may be used as a circuit which conducts fuzzy logic calculations. In control employing fuzzy logic, calculations are conducted with respect to a variety of membership functions, and the center of gravity of the distribution is finally calculated from the distribution functions obtained, and thereby, control variables are specified. It is of course the case that this operational circuit may be employed in such a manner.

Furthermore, the position of the final center of gravity in all applications is a digital signal output; in this embodiment of the invention, this is done by means of a digital flag at the position of the center of gravity. For example, in the case in which the position of the arms of a robot, for example, is controlled, the use of analog values for the control variable is preferable in order to conduct smooth control. In such a case, the gain of the CMOS inverter 201 of FIG. 2, for example, may be reduced in size, and analog output may be conducted, and the subsequent circuits 127–133 may also have analog output, so that the position of the center of gravity is outputted as a continuous variable.

It is possible to conduct analog vector operations at extremely high speed and with a high degree of accuracy without requiring complicated control circuitry.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A semiconductor operational circuit which executes a predetermined operation with respect to a signal train of N signals $A_i, \ldots, A_{i=N}$ numbered using a first integer i which changes from 1 to N, said circuit comprising:

a first means for generating an output signal M proportional to the sum of the signal train $$\left(\sum_{i=1}^{N} A_i\right);$$

a second means for generating an output signal S proportional to the sum of the product of each one of the N signal train signals and a respective predetermined weighting constant $X_i$ defined with respect to the first integer i $$\left(\sum_{i=1}^{N} x_i A_i\right); \text{and}$$

a circuit for calculating the difference between $f_j M$ and $g_j S$ using L sets of constants $(f_j, g_j)$ defined with respect to a second integer j which changes from 1 to L and generating an output signal having a logic "1" or "0" in accordance with the results thereof.

2. A semiconductor operational circuit in accordance with claim 1, wherein a ratio $g_j/f_j$ of said $g_j$ and $f_j$ increases by a fixed amount when the value of j is increased by 1.

* * * * *